Feb. 16, 1926.                                                    1,573,502
C. A. PETERS
METHOD AND APPARATUS FOR MOLDING REENFORCED COMPOSITION STUDDING
Filed April 5, 1924
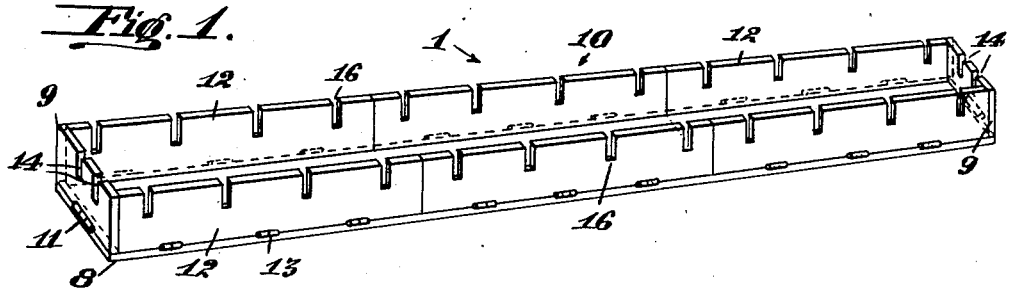
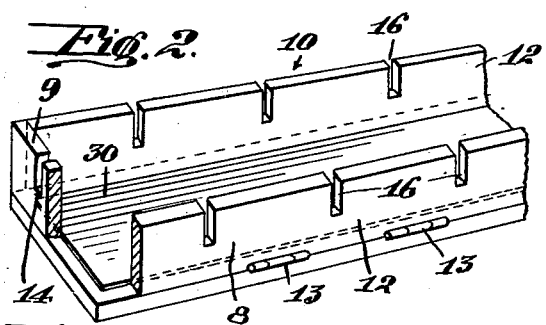
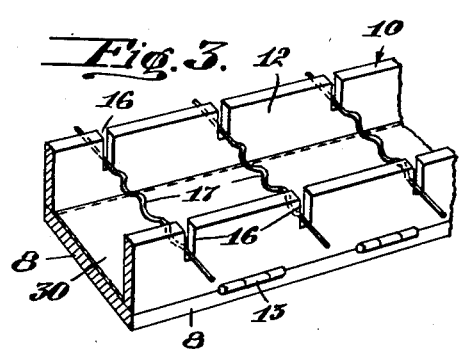
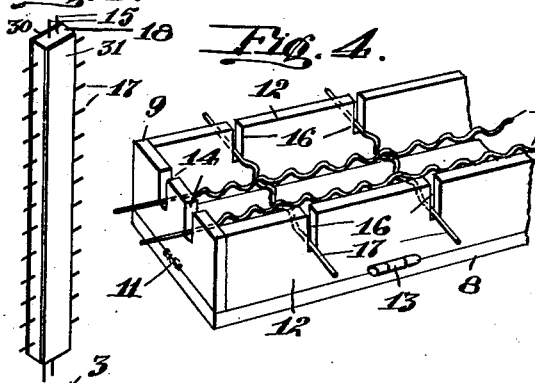
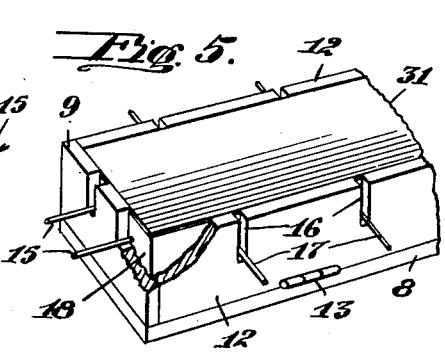
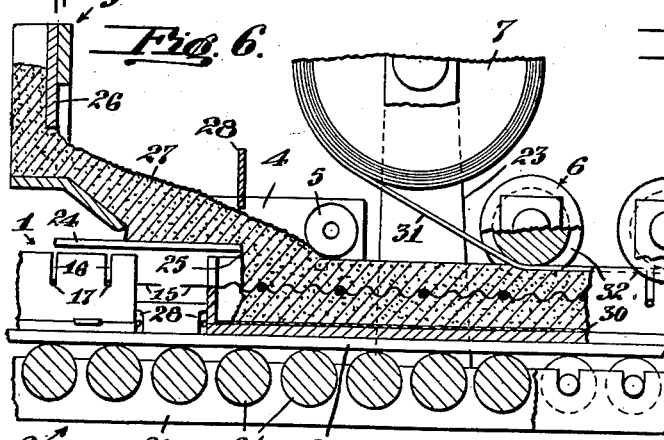
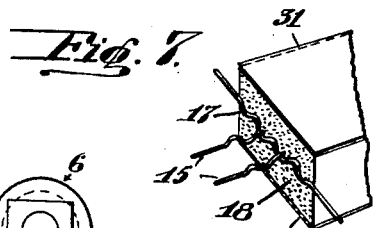
Inventor
Charles A. Peters;
By
R. S. Berry
Attorney.

Patented Feb. 16, 1926.

1,573,502

UNITED STATES PATENT OFFICE.

CHARLES ALBERT PETERS, OF DOWNEY, CALIFORNIA, ASSIGNOR TO PETERS HOLDING COMPANY, A CORPORATION OF CALIFORNIA.

METHOD AND APPARATUS FOR MOLDING REENFORCED-COMPOSITION STUDDING.

Application filed April 5, 1924. Serial No. 704,382.

*To all whom it may concern:*

Be it known that I, CHARLES ALBERT PETERS, a citizen of the United States, residing at Downey, in the county of Los Angeles and State of California, have invented new and useful Improvements in Methods and Apparatus for Molding Reenforced-Composition Studding, of which the following is a specification.

My invention relates to a method and apparatus for molding and particularly for molding reenforced concrete studding of the character shown in my co-pending application filed on even date herewith, and the general object thereof is to provide a method and apparatus for molding such studding in great quantities.

An object is to provide a means and method for forming a composition studding of a body of plastic material interposed between reenforcing side facing sheets with reenforcements embedded therein and arranged with terminals of the wire reenforcements projecting from the ends and edges of the studding.

A more particular object is to provide a method and apparatus of the character stated which is simple, inexpensive and highly efficient.

With the foregoing objects in view, together with such other objects and advantages as may subsequently appear, my invention resides in the parts, and in the combination, construction and arrangement of parts as hereinafter described and claimed, and illustrated by way of example, in the accompanying drawings, in which—

Figure 1 is a perspective view of my molding apparatus.

Figure 2 is a fragmentary perspective view of one end of the mold of my apparatus partly broken away and showing one of the facing sheets in the bottom of the mold.

Figure 3 is a fragmentary perspective view of the mold of my apparatus showing one of the facing sheets in the bottom of the mold and three transverse reenforcing rods in position in the mold for molding.

Figure 4 is a perspective view of the mold of my apparatus, showing one of the facing sheets in the bottom of the mold and the longitudinal and two of the transverse reenforcing rods in molding position in the mold.

Figure 5 is a fragmentary perspective view of the mold of my apparatus showing a studding of plastic material molded therein.

Figure 6 is a fragmentary longitudinal section of my molding apparatus.

Figure 7 is a perspective view of one end of a plastic studding molded in my apparatus.

Figure 8 is a perspective view of a plastic studding molded in my apparatus.

My apparatus preferably comprises a plurality of molds 1, a mold conveyor 2, a composition container 3, a hopper 4, a gage roller 5, guide rollers 6, and a facing sheet supply roll 7.

The mold 1 comprises a bottom wall 8, end walls 9 and side walls 10. Said end walls are hinged at their lower ends to the ends of said bottom wall by hinges 11, so that they may swing outwardly to open the mold. The side walls 10 are made in a plurality of sections 12 which are hinged at their lower edges to the side edges of the bottom 8 by hinges 13 so that they may swing outward to open the mold. The end walls 9 are each provided with a pair of spaced slots 14 extending downwardly from the upper edge of said walls to receive the longitudinal reenforcing rods 15 of the studding to hold the same in position in the mold for molding the same in the studding. The side walls 10 are provided with a plurality of spaced slots 16 extending downwardly from the upper edge thereof to receive the transverse reenforcing rods 17 of the studding to hold said rods in position in the mold for molding the same in the studding. The reenforcing rods 15 and 17 may be of any suitable form but are preferably of serpentine formation and said rods may be placed in the mold so that the concave sides of the rods 15 rest in the concave sides of the rods 17, thus interlocking said rods when molded in the composition body 18 of the studding, as shown in Figure 7.

The conveyor 2 comprises a frame 20, a plurality of horizontal rollers 21 journaled in said frame, and a conveyor belt 22 supported on said rollers. The gage roller 5 is journaled in the forward end of the hopper 4. The rollers 6 are journaled in the upper part of the frame 20. The facing sheet supply roll 7 is journaled in brackets 23 upstanding from the frame 20. The bottom wall 24 of the hopper 4 rests slightly above the molds 1 and rearwardly of the delivery opening 25 of the hopper. The container 3 has a door 26 for controlling the flow of the plastic material 27 from said container to the hopper 4. A gate 28 may be mounted in the hopper 4 for shutting off the delivery of the material 27 from said hopper through the delivery opening 25 into the mold 1 therebelow on the conveyor belt 22 when the rear end of the mold is conveyed past said opening so that no material will drop on the belt between the molds, which are placed on said belt longitudinally in spaced relation, as shown in Figure 6. Pins 28 are secured on the belt 22 between which the molds are placed on the belt, whereby the said molds are held in longitudinally spaced relation on the belt.

In practicing my invention I first place a facing sheet of paper 30 on the bottom of the mold 1 (see Figure 2). I next place the transverse reenforcing rods 17 in the mold transversely within the slots 16 with the ends of the rods projecting outwardly through the side walls 10 of the mold (see Figure 3). I next place the longitudinal reenforcing rods 15 longitudinally in the mold within the slots 14 with the ends of said rods projecting through the end walls 9 of the mold (see Figure 4). A plurality of molds thus prepared are then placed on the belt 22 between the pins 28 in longitudinally spaced relation. The belt being driven toward the right and the door 26 and gate 28 being opened, the plastic material flows out of the container 3 through the door 26 into the hopper 4 and out of said hopper through delivery opening 26 into the molds as they are conveyed past said opening, the material being shut off by the gate 28 between molds so that the material will not drop onto the belt between the molds. The plastic material is gaged by the gage roller 5 so that the upper level of the material coincides with the upper edges of the mold and a facing sheet 31 is unwound from the roll 7 between the rollers 6 and the upper surface of the material, which rollers press the sheet firmly against the upper side of the studding.

The rolls 6 are formed with peripheral flanges 32 which project alongside the outer faces of the side walls 10 of the molds and serve to hold the walls 10 in an upright position as the molds are advanced under the rollers. As a studding is molded in a mold, the mold is removed from the belt 22, the end walls 9 and side walls 10 are swung down on their hinges 11 and 13, and the studding is then removed from the mold, with the facing sheets 30 and 31 secured on the sides of the plastic body 18 and the longitudinal reenforcing rods 15 and the transverse reenforcing rods 17 molded longitudinally and transversely in said body with the rods 15 projecting out of the ends and the rods 17 projecting out of the edges of said body.

Having described my invention, I claim—

1. The method of forming reenforced plastic studding which consists in placing a permanent facing sheet in the bottom of a mold, placing reenforcements in said mold, conveying the mold past a point of delivery, delivering plastic material at said point into the mold and rolling said plastic material down into the mold and around and below said reenforcements, and placing a permanent facing sheet on the molded plastic material.

2. The method of forming reenforced plastic studding which consists in positioning a series of longitudinal and transverse reenforcement bars in molds in supported spaced relation to the bottom of the mold, conveying said molds in spaced relation past a point of delivery, and delivering the plastic material at said point into said molds around and below said reenforcements.

3. The method of forming plastic studding which consists in placing a facing sheet in the bottom of a studding mold, conveying a plurality of such molds past a point of delivery, delivering plastic material at said point of delivery into said molds as they pass thereby, and placing a facing sheet on the upper surface of said plastic material.

4. The method of forming reenforced plastic studding which consists in placing a facing sheet in the bottom of a mold, placing reenforcements in said mold, conveying a plurality of such molds past a point of delivery, and delivering plastic material into said molds as they pass said point.

5. The method of forming plastic studding comprising placing a permanent facing sheet in the bottom of a mold, delivering plastic material into said mold, and placing a permanent facing sheet upon the upper face of said plastic material, whereby both of said facing sheets will permanently adhere to the molded material.

6. The method of forming plastic studding which consists in placing a facing sheet in the bottom of a mold, conveying a plurality of such molds past a point of delivery, delivering plastic material at said point into said molds as they pass, and placing a single facing sheet upon the surface of said material in all of said molds.

7. In an apparatus for forming studding, a conveyor, a hopper, a plurality of studding molds placed on said conveyor into which plastic material is delivered from said hopper as said molds are conveyed thereunder, and means for placing a facing sheet on the upper face of the plastic material in the molds as they travel beyond said hopper.

8. In an apparatus for forming studding, a conveyor, a hopper, a plurality of studding molds placed on said conveyor into which plastic material is delivered from said hopper as said molds are conveyed thereunder, each of said molds having side walls hinged to swing outwardly, means for holding said side walls stationary while the molds are being advanced, and a roller for gaging the upper surface of the plastic material in the molds and compressing said material.

9. In an apparatus for forming reenforced studding, a mold including a bottom wall, end walls and side walls, said end walls having slots extending downwardly from their upper edges to hold longitudinal reenforcing rods longitudinally in the mold, each of said side walls being formed of a plurality of hinged sections.

10. In an apparatus for forming studding, a mold including a bottom wall, end walls and side walls, said side walls having slots extending downwardly from the upper edges thereof to hold transverse reenforcing rods transversely in said mold, each of said side walls being formed of a plurality of hinged sections.

11. In an apparatus for forming studding, a mold including a bottom wall, end walls and side walls, said end walls having slots extending downwardly from the upper edge thereof to hold longitudinal reenforcing rods longitudinally in the mold, and said side walls having slots extending downwardly from the upper edge thereof to hold the transverse reenforcing rods transversely in the mold, each of said side walls being formed of a plurality of hinged sections.

12. In an apparatus as disclosed, a mold comprising a bottom wall, side walls, end walls, said side walls and said end walls being hinged to said bottom wall to swing down therefrom to open the mold, said side walls including a plurality of independently hinged sections.

13. In apparatus for forming studding, a conveyor, a plurality of molds adapted to be carried upon said conveyor, each of said molds having hinged side walls, and a roller beneath which said molds pass, the roller having flanges for engaging the hinged side walls of the molds to maintain the same in operative position.

14. In an apparatus for forming studding, a conveyor, a hopper, a plurality of studding molds placed on said conveyor into which plastic material is delivered from said hopper as said molds are conveyed thereunder, and means for rolling a facing sheet on the upper surface of the plastic material in the molds.

15. In an apparatus for forming studding, a mold including a bottom wall, end walls and side walls, said end walls having slots extending downwardly from the upper edges thereof to hold longitudinal reenforcing rods longitudinally in the mold in spaced relation to the bottom thereof, and said side walls having slots extending downwardly from the upper edges thereof to hold transverse reenforcing rods transversely in the mold in spaced relation to the bottom thereof; said side walls being hinged to said bottom walls to swing outwardly and downwardly.

CHARLES ALBERT PETERS.